(12) United States Patent
Freeman et al.

(10) Patent No.: US 11,962,470 B2
(45) Date of Patent: Apr. 16, 2024

(54) METHOD TO COMMISSION A DISTRIBUTED SYSTEM

(71) Applicant: Schneider Electric USA, Inc., Andover, MA (US)

(72) Inventors: Alan Freeman, Raleigh, NC (US); Kevin M. Jefferies, Raleigh, NC (US); Benjamin Edwards, Rolesville, NC (US); Matthew White, Cary, NC (US)

(73) Assignee: Schneider Electric USA, Inc., Boston, MA (US)

( * ) Notice: Subject to any disclaimer, the term of this patent is extended or adjusted under 35 U.S.C. 154(b) by 312 days.

(21) Appl. No.: 17/483,906

(22) Filed: Sep. 24, 2021

(65) Prior Publication Data
US 2023/0102683 A1 Mar. 30, 2023

(51) Int. Cl.
*H04L 41/12* (2022.01)
*H04L 12/42* (2006.01)

(52) U.S. Cl.
CPC .............. *H04L 41/12* (2013.01); *H04L 12/42* (2013.01)

(58) Field of Classification Search
CPC ..... H04L 41/12; H04L 12/42; H04L 41/0806; H04L 41/0853; H04L 41/0889; H04L 41/0895; H04L 41/145; H04L 41/122; H04L 41/5054; H04L 12/40; H04L 12/44; H04L 2012/4026; G01R 19/2513; G05B 19/4185; G05B 19/41885
See application file for complete search history.

(56) References Cited

U.S. PATENT DOCUMENTS

| 7,092,771 B2 * | 8/2006 | Retlich | G05B 19/41885 |
| | | | 700/83 |
| 8,165,723 B2 * | 4/2012 | Nasle | G06F 30/20 |
| | | | 700/286 |

(Continued)

FOREIGN PATENT DOCUMENTS

WO 2021037133 A1 3/2021

OTHER PUBLICATIONS

European Search Report and Search Opinion dated Feb. 15, 2023 for corresponding European Patent Application No. EP22190548.2, 12 pages.

*Primary Examiner* — Brian T O Connor
(74) *Attorney, Agent, or Firm* — Locke Lord LLP

(57) ABSTRACT

A method and system are provided to facilitate the commissioning of a distributed system. The method and system obtains a base configuration which defines an expected virtual topology for a distributed system, and identifies via a control device a physical network topology of the distributed system to commission the distributed system. The control device performs network discovery to identify a plurality of connected devices that are communicatively coupled thereto, and to collect device information for each connected device relating to its identity and relative position in the distributed system which has connected devices or associated subnetworks connected in a ring network topology. The collected device information for the plurality of connected devices is compared to the expected virtual topology from the base configuration to determine an identity and physical location of the plurality of connected devices and associated subnetworks in the physical network topology of the distributed system.

24 Claims, 12 Drawing Sheets

(56) References Cited

U.S. PATENT DOCUMENTS

| | | | |
|---|---|---|---|
| 8,509,935 B2* | 8/2013 | Hoyte | G05B 19/0426 |
| | | | 700/52 |
| 9,647,906 B2* | 5/2017 | Asenjo | G05B 19/048 |
| 10,250,438 B2* | 4/2019 | Asenjo | H04L 43/0817 |
| 10,303,127 B2* | 5/2019 | Mazur | G05B 19/042 |
| 10,935,946 B2* | 3/2021 | Day | H02J 13/00004 |
| 11,300,940 B1* | 4/2022 | Plessing | G06F 9/547 |
| 11,392,112 B2* | 7/2022 | Stump | G05B 19/4185 |
| 11,656,589 B2* | 5/2023 | Zhang | H02J 3/00 |
| | | | 702/59 |
| 2014/0078888 A1 | 3/2014 | Jenkins et al. | |
| 2022/0141089 A1 | 5/2022 | Liu et al. | |

\* cited by examiner

METHOD TO COMMISSION A DISTRIBUTED SYSTEM

TECHNICAL FIELD

The present disclosure relates to a distributed system, and more particularly, to commissioning of an assembled distributed system of networked devices.

BACKGROUND

Some industrial products, such as motor control centers (MCCs), are made up of a group of coordinated networked devices which are meant to serve a common function. When these products are assembled, there is often a commissioning step that is required to confirm correct assembly (e.g., order, identifier (ID), initialization of settings, etc.) of these distributed systems before they can be started or operated. For example, a user would physically pair each of the networked devices to associate their electronic address with their physical location. Thus, the operations for commissioning such products are often time and labor intensive, particularly when they have a large number of assembled networked devices.

SUMMARY

In accordance with an embodiment, a method and system are provided to facilitate the commissioning of a distributed system. In the method and system, a base configuration is obtained which defines an expected virtual topology for a distributed system. A physical network topology of the distributed system is identified by a control device. To identify the physical network topology, network discovery is performed to identify a plurality of connected devices that are communicatively coupled to the control device in the distributed system, and device information is collected for each of the plurality of connected devices relating to its identity and relative position in the distributed system. The distributed system includes a plurality of subnetworks of connected devices from the plurality of connected devices. At least one of the plurality of subnetworks has a ring network topology, or the plurality of subnetworks are connected in a ring network topology. Furthermore, in the method and system, the collected device information for the plurality of connected devices is compared to the expected virtual topology from the base configuration to determine an identity and physical location of the plurality of connected devices and associated subnetworks in the physical network topology of the distributed system. The distributed system is commissioned according to the identified physical network topology.

In a further embodiment, in the method and system, if the physical location of some connected devices in at least one subnetwork having a ring network topology remains undetermined in the physical network topology for the distributed system after the comparing operation, the physical network topology is identified by further (1) obtaining additional information relating to a physical layout of the connected devices in the at least one subnetwork, and (2) determining the physical location of the undetermined connected devices in the physical network topology based on the additional information. To obtain addition information, the method and system can employ one or more internal signals, which are measured, to obtain additional information relating to the physical layout of the connected devices in the at least one subnetwork.

In an embodiment, the one or more internal signals can comprise a voltage signal supplied to the connected devices of at least one subnetwork, a connected order of the connected devices in the at least one subnetwork being determined based on a comparison of measured voltage at two or more of the connected devices of the at least one subnetwork. In another embodiment, the one or more internal signals comprise an audio signal outputted to or at two or more of the connected devices of the at least one subnetwork, a connected order of the connected devices in the at least one subnetwork being determined based on a comparison of audio measurements for two or more of the connected devices of the at least one subnetwork.

In another embodiment, the distributed system comprises a motor control center having a plurality of columns each including connected devices comprising a column head and motor management units connected thereto in a subnetwork configuration, and the control device comprises an industrial computer of the motor control center.

In yet another embodiment, the device information for a connected device comprises at least relative location information identifying any neighboring connected device and identification information identifying a type of device or its capabilities.

In a further embodiment, in the method and system, the collected device information for the plurality of connected devices is compared to the expected virtual topology from the base configuration by matching the identified plurality of connected devices to virtual counterparts in the expected virtual topology from the base configuration using the collected device identification information to identify at least a partial physical network topology of the distributed system. The identified at least a partial physical network topology can include an identity of one or more subnetworks of connected devices from the plurality of connected devices and their connected devices, a connected order of the subnetworks, and/or a connected order of the connected devices for one or more of the subnetworks in the distributed system.

In a further embodiment, the at least one subnetwork having a ring network topology comprises multiple subnetworks each having a ring network topology. In the method and system, if the physical location of connected devices for the multiple subnetworks remains undetermined for the distributed system, the operation to obtain additional information is performed for the multiple subnetworks one-at-a-time until the physical location of all of the remaining undetermined connected devices of the multiple subnetworks are determined in the physical network topology for the distributed system based on the obtained additional information.

In an embodiment, the expected virtual topology from the base configuration is designed according to uniqueness and asymmetry rules to differentiate the subnetworks from each other and/or a connected order of the connected devices in the subnetworks.

In an embodiment, the subnetworks are connected in a ring network topology. In the method and system, if the physical location of some subnetworks from the subnetworks remains undetermined in the physical network topology for the distributed system, the physical network topology is identified by further (1) obtaining information relating to a physical layout of the undetermined subnetworks, and (2) determining the physical location of the undetermined subnetworks in the physical network topology based on the obtained information.

In accordance with an embodiment, a method and system can involve: receiving a base configuration defining an expected virtual topology for a distributed system; and performing, by a control device, a network discovery operation to identify a physical network topology of the distributed system The performing operation can include identifying a plurality of connected devices that are communicatively coupled to the control device; determining a subnetwork configuration of a respective subnetwork for each of the plurality of connected devices, wherein the respective subnetworks are configured in a ring network topology; and matching each respective connected device with predefined device identity data within the base configuration based on the determined subnetwork configurations, comprising determining an ordering of devices within each respective subnetwork. The method and system can further involve commissioning the distributed system, based on the identified physical network topology.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
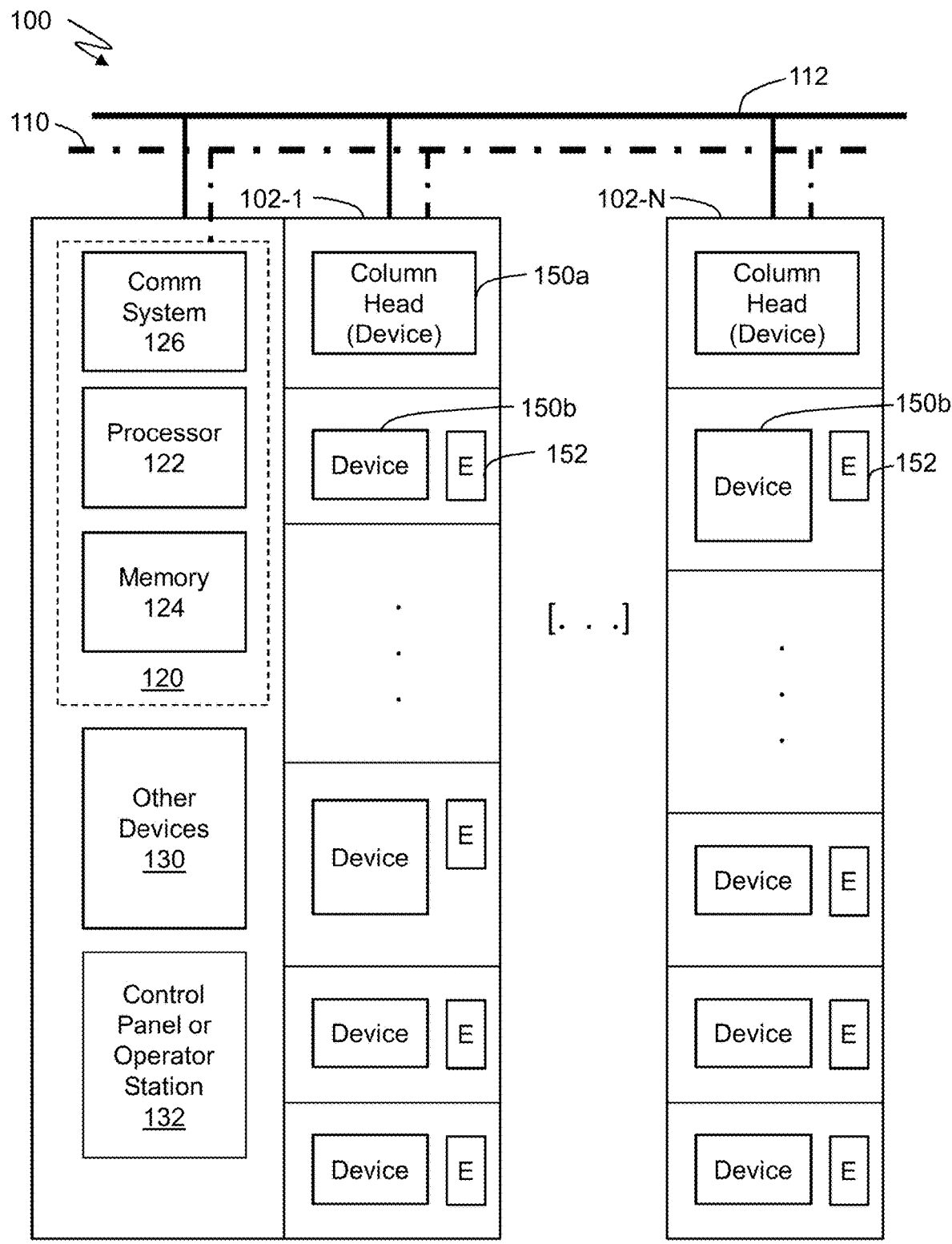
FIG. 1 is a block diagram illustrating an example distributed system, in accordance with an embodiment.

The present disclosure is directed to a method and system for facilitating the commissioning of an assembled distributed system with a plurality of network devices or nodes. The method and system is configured to automatically discover or identify, via a control device (e.g., computer or controller) at least a partial physical topography of the distributed system by using network discovery to perform a network scan to collect device information for connected devices (e.g., network devices or nodes) communicatively coupled to the control device in the distributed system. The collected device information from the network scan can be compared to an expected virtual topology in a base configuration (e.g., physical-to-virtual pairing). The collected device information can include information regarding the identity and relative position of the device in the distributed system. When the physical network topology for the distributed system has been sufficiently or completely discovered (or identified), the distributed system can be commissioned, for example, by associating an electronic address to the physical location for each connected device in the system. The commissioning operation may also include performance of other tasks (e.g., device diagnostics, calibration, etc.) before the distributed system is allowed to begin normal operations.

Accordingly, the method and system of the present disclosure can reduce the steps, effort, and time required when commissioning a distributed system, including for example to pair an electronic address of networked devices to their physical locations in the system (e.g., a particular compartment of a particular column).

In the present disclosure, the distributed system may be a motor control center (MCC) including a plurality of columns (e.g., vertical cabinet or enclosure sections), in which connected devices are housed in compartments (e.g., drawers) of the columns and configured in subnetwork configurations. An example of an MCC can include up to 10 columns each with up to 30 drawers, representing a total of 310 possible Ethernet nodes on a network. For redundancy, each device may be connected as part of a ring or loop network topology (hereinafter "ring network topology"), with many loops (e.g., ring subnetworks) emanating off one larger loop (e.g., ring network). The connected devices may include motor management units (MMUs) and other networked electronic devices. The distributed system may have its devices connected via Ethernet (e.g., Ethernet nodes), non-deterministic network or other network configuration having the capability of performing a network scan. In various embodiments, the distributed system may perform a network scan through network discovery by using a link layer discovery protocol (LLDP) or other similar discovery protocol, which can enable the identification of networked/connected devices in a system and the collection of device information for the devices relating to their identity (e.g., type, model or capability of the device) and relative location in the distributed system (e.g., identification of neighboring device(s)).

In various embodiments, the distributed system may be configured to include a plurality of subnetworks of connected devices, which have a ring network topology. A network discovery operation of a ring or loop network (hereinafter "ring network") may return a relative location of a device, e.g., its neighboring devices. As such, it may not be immediately apparent from a network scan whether a device is the first or last device in a connected order in a ring network, particularly where the first and last devices are the same type of networked electronic device and the order of the types of connected devices when seen from either direction, e.g., Top and Bottom, is symmetrical. To improve automatic discovery of a greater amount of the physical network topology of a distributed system that includes one or more ring networks or subnetworks, the distributed system may be designed with asymmetry and uniqueness to increase matching of connected devices and associated subnetworks to their counterpart in the expected virtual topology from the base configuration. For example, different number, types and/or orders of connected devices can be selected for each ring network/subnetwork in the distributed system to be assembled and commissioned. In various embodiments, a selector software tool can be provided, which can be implemented through a computer, to enable a user to design and generate a base configuration for an expected virtual topology of a distributed system with uniqueness and asymmetry as a rule, thereby increasing the chances of physical-to-virtual pairing and reducing cases where a user may need to intervene. The selector software tool can employ asymmetry and uniqueness rules to constrain or provide recommendations when a user is designing an expected topology for a distributed system (e.g., the subnetworks/columns can have different number of connected devices, the type and ordering of the connected devices are different in the subnetworks/columns, and so forth). The selector software tool also can be configured to automatically generate a virtual topology for a distributed system based on design parameters (e.g., number and type of devices such as MMUs, Columns and other devices; type of network architecture such as a baseline network architecture, a network architecture with no managed switches, a network architecture with no managed switches and with separate loops, a network architecture with redundancy using ring network and/or ring subnetworks, etc.).

In various embodiments, when the system and method of the present disclosure can only determine a partial physical network topology for the distributed system through the information collected from a network scan via a network discovery operation, additional information can be obtained to facilitate identification of the remainder of the physical network topology (e.g., identification of the physical location of any remaining undetermined (e.g., undetermined, unmatched, unpaired, etc.) connected device(s) or subnetwork(s) to their virtual counterpart or twin in the base configuration). The additional information can be used to reduce the number of unknown variables for those connected devices or associated subnetworks that have not been matched to counterparts in the expected virtual topology.

In one example, the system and method of the present disclosure can use and measure internal signals (e.g., voltage signal, audio signal, or other signal(s) produced or provided internally in the distributed system) in relations to or between two or more connected devices to obtain additional information related to a physical layout of connected devices or associated subnetworks/columns. In some embodiments, a column can represent a subnetwork configuration. For instance, to reduce unknowns within a column, a control voltage can be measured to identify the top device. For example, the top device may have a higher voltage than the bottom one which is farthest from the power supply. The compartments (e.g., drawers) of the columns can be configured to waste power so the drop is increased to make measurement more certain. Unknowns within a column can also be reduced by measuring audio signal (e.g., signal in the audible frequency range). For instance, the power supplies can switch at a unique (audible) frequency for any compartment/connected device in a column or sound generation devices can be provided to generate sound at desired location(s) in the system. The sound can be detected at the control device, via a sensor, to determine which connected device is closest or farthest away in a column. Alternatively, audible frequency or sounds can be generated at the control device, and the sound can be detected at two or more connected devices to determine their relative distance to the control device.

In another example, the system and method of the present disclosure can obtain additional information relating to a physical layout of connected devices or associated subnetworks/columns from a user. For instance, the user can provide the additional information by performing a physical pairing for any undetermined connected device or subnetwork/column. The physical pair can involve a data matrix scan, a physical button press, or other operations implemented by a user, at the device or its compartment in a column. A data matrix scan can be performed using a user device (e.g., mobile device such as a smartphone, computer tablet, laptop, etc.) at the physical location of the undetermined connected device or column/subnetwork, and relevant information is transmitted to or obtained by the control device. A user device/computer can include a processor(s), memory, input/output device(s), a communication system to conduct wireline or wireless communication, and other known computer-related components, in order to perform operations described herein.

These and other features of the present disclosure will be described in further detail below with reference to the example figures.

FIG. 1 illustrates an example distributed system 100, which includes a plurality of networked electronic devices that are communicatively coupled across a communication medium(s) including communication buses 110 and are powered by a power distribution system (e.g., 3-phase system) over power lines including power buses 112. The electronic devices can be assembled to perform a function, and are housed in sections of cabinets or enclosures. In various embodiments, the distributed system may have its devices connected via Ethernet (e.g., Ethernet nodes) or other similar network configuration. The distributed system 100 may also implement network discovery using a link layer discovery protocol (LLDP) or other similar discovery protocol to perform a network scan which can enable the identification of networked/connected devices in a system and the collection of device information for the devices. The device information can include information for a networked device, which relates to the identity (e.g., type, model or capability of the device) and relative location in the system (e.g., identification of neighboring device(s) or network nodes).

In this example, the electronic devices of the distributed system 100 can include a control device 120 and devices communicatively coupled thereto (also referred to as "connected devices" herein). The connected devices are housed in columns (e.g., vertical cabinet or enclosure sections), such as in respective compartments (e.g., drawers, etc.) of the columns 102-1 through 102-N (where N is a number of columns in the system), generally referred to as columns "102". The connected devices can include column-heads 150a and other devices 150b connected thereto which are housed in compartments of the columns 102. The column-heads 150a can be a communication switch(es) or the like for controlling or coordinating network communications, including those with devices connected thereto in a subnetwork configuration. For example, the column-head 150a can be an Ethernet switch or the like. In various embodiments, the distributed system 100 can have a plurality of subnetworks of connected devices 150 (e.g., 150*a*, 150*b*), which can include one or more subnetworks having a ring network topology. For example, each column 102 with a column head 150*a* can be configured in a subnetwork configuration. The subnetworks can also be connected in a ring network topology. In various embodiments, the plurality of subnetworks also may have one or more subnetworks having a non-ring network topology, for example, if redundancy is unnecessary or depending on the application. The distributed system 100, when assembled and commissioned, can be a product(s) which is configured, for example, to monitor and/or control operations of a process or system, such as an industrial process or system.

The control device 120 can be a main control device, which is configured to control operations of the distributed system 100 and components thereof, including the automatic discovery and other methods related to the commissioning of the system 100, as described herein. The control device 120 can be a computer or controller, such as an industrial computer or controller. The control device 120 can include one or more processors 122, memory 124 and communication system 126 for conducting wireline and/or wireless communication with devices of the distributed system 100 as well as other devices or systems (e.g., customer device, user operable computer device/user device, etc.). Other devices 130 can be provided at or coupled to the control device, such as sound generator or other components for implementing the various functions and features described herein. A user can interact with the control device 120 through a control panel or operator station 132, or a user device such as a smartphone, tablet, computer or other computer system (not shown). The control panel or operation station 132 can be a (Human Machine Interface) HMI touchscreen device or other HMI computer.

The memory 124 can store any data required by the processor(s) 122 for performing functions related to the commissioning and control of the distributed system 100 and its components, as described herein. The functions can include, but are not limited to: obtaining a base configuration (including any updates) of an expected virtual topology of the distributed system; communicating with other devices inside and outside of the distributed system; identifying the physical network topology of the distributed system 100 (including update thereof); generating, controlling and/or measuring internal signals (e.g., voltage signal(s), audio signal(s), etc.) in the distributed system; outputting a progress of the identification of the physical network topology to a user (or user device); facilitating physical paring by a user for one or more connected devices; facilitating user input of information relating to a layout or connected order (e.g., order, direction, etc.) for one or more connected devices or subnetworks/columns; controlling the operations of the distributed system 100 (including after the system is commissioned); implementing a selector software tool for generating a base configuration subject to asymmetry and uniqueness rules, and/or other functions and features described herein.

The memory 124 can, for example, store data of base configuration(s), selector software tool, asymmetry and uniqueness rules, operating parameters and thresholds for the system and its components, physical network topology of the distributed system including electronic addresses and physical locations for devices of the distributed system and other devices and systems (e.g., data matrices for devices including device address, device physical location and other device data), application code (e.g., main functionality firmware), initialization parameters, boot code, code for executing algorithms, code for implementing the methods and processes described herein, and/or other data. This data can be stored in the memory 124 at the factory, manually entered via an input/output device (not shown), or remotely downloaded via the input/output device. The memory 124 can be integrated with the control device 120, or the memory 124 can be external and remotely coupled to the control device 120. The memory 124 can be, for example, random access memory (RAM), read only memory (ROM), electronic erasable programmable read only memory (EEPROM), flash memory, or other volatile or non-volatile memory (i.e., non-transitory computer readable media).

The connected devices 150*b* can include management units such as controllers for monitoring and/or controlling the operations of equipment in a system or process, such as industrial system or process. In various embodiments, the connected devices 150*b* can be motor management units (MMUs) such as motor controllers (e.g., variable frequency drives (VFDs)), programmable logic controllers (PLCs), programmable automation controllers (PACs) and other types of controllers or electronic devices of the distributed system 100. Furthermore, the connected devices 150*b* can have associated therewith other equipment (E) 152, which may be housed together in respective compartments of the columns 120. The equipment 152 can include, among other things, power supply circuitry (including switches such as a power connect/disconnect switch), overload relay, circuit protection devices (e.g., circuit breakers and fuses), one or more sensors for measuring internal signal(s) at a corresponding device 120 or its compartment (e.g., voltage sensor, audio or frequency sensor, etc.), push button or other user inputs for operating an associated connected device 150*b*, scannable codes (e.g., QR or other codes such as on an exterior of the compartment) for providing information about the equipment housed in the compartment, input/output (I/O or IO) module (or other communication system) for an associated connected device, and so forth.

In operation, after the distributed system 100 is assembled, the control device 120 can be operated to facilitate the commissioning of the system 100. Various example methods for facilitating the commissioning of a distributed system will be described further below with reference to FIGS. 3-9. It should be understood that the distributed system 100 shown in FIG. 1 illustrates one example of a network architecture. The commissioning scheme in the present disclosure, described herein, can be employed with other network architectures (e.g., FIGS. 10-12).

Figure 2:
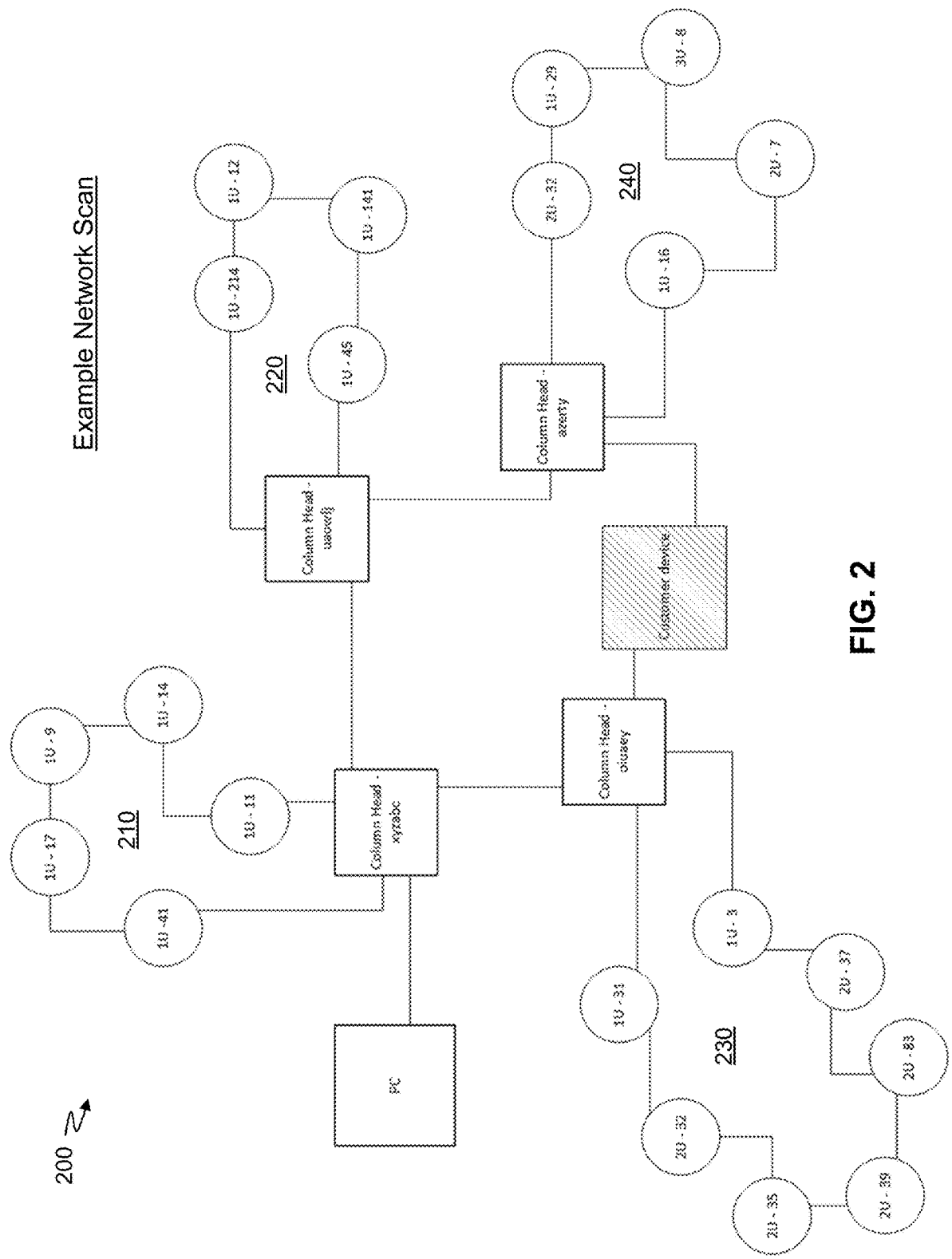
FIG. 2 illustrates an example of information gathered in a network scan related to a physical network topology of a distributed system through a network discovery operation, in accordance with an embodiment.

FIG. 2 illustrates an example of information gathered from a network scan of an example distributed system through a network discovery operation, in accordance with an embodiment. In this example, the information collected from the network scan is represented as a map 200 of the distributed system and its network nodes, for the purposes of explanation. In FIG. 2, the map 200 shows the identity and relative locations of various network nodes, including a control device (e.g., PC), customer device, and connected devices such as column heads (e.g., xyzabc, uaowlj, oivaey and azerty, etc.) and management units (e.g., 1 U, 2 U, 3 U, etc.) connected thereto. Each column head and its connected management units are configured as a subnetwork with a ring network topology (e.g., loop), as shown by the reference numbers 210, 220, 230 and 240. The subnetworks 210-240 and the customer device are also connected in a ring network topology.

In this example, the distributed system is designed with some uniqueness and asymmetry, which can increase the identification of an amount of the physical network topology by the control device when comparing and analyzing the collected device information from the network scan and the expected virtual topology (and its uniqueness and asymmetry) from the base configuration.

For example some of the subnetworks 210-240 are designed with a different number of management units (e.g., 1 U, 2 U and 3 U), e.g., the subnetworks 210 and 240 have 5 management units, the subnetwork 220 has 4 management units, and the subnetwork 230 has 7 management units. Furthermore, the type and order of management units for the subnetworks 210 and 240 have different first/top and last/bottom management units in relations to their column heads. For example, the subnetwork 210 has two 1 U management units (e.g., 1 U-11 and 1 U-41) as either the first or last subnetwork node, and the subnetwork 240 has a 1 U management unit (e.g., 1 U-16) and a 2 U management unit (e.g., 2 U-32) as either the first or last subnetwork node and also has a 3 U management unit. Thus, the subnetworks 210-240 are different from each other, either by their number of management units or the type and order of their connected management units. Accordingly, the identity and physical location of the subnetworks 210-240 and the customer location can be ascertained through automatic discovery using the information collected from a network scan when compared against the expected virtual topology of the distributed system. Furthermore, the connected order of the management units, for example, including the first unit (e.g., Top) and the last unit (e.g., Bottom), for the subnetwork 240 can also be ascertained through automatic discovery given the asymmetry of the connected types and order of its management units. (e.g., either 1 U-16 or 2 U-32 is the first or last subnetwork node) when compared against the expected virtual topology of the distributed system.

However, as shown in FIG. 2, the connected type and order of the management units for subnetworks 210, 220 and 230 appear to be symmetrical, e.g., subnetworks 210 and 220 includes all 1 U management units, and subnetwork 230 includes management units which are symmetrical from either direction (e.g., the order from either direction in the loop is: 1 U, 2 U, 2 U, 2 U, 2 U, 2 U and 1 U). Accordingly, additional information relating to a physical layout or connected order (e.g., order, direction, etc.) would need to be obtained to identify the first or last management unit for each of the subnetworks 210, 220 and 230. Such information can be obtained by the control device through internal signals measured in relations to at least two management units for each of the subnetworks 210, 220 and 230, or from the user. However, to facilitate automatic discovery, the types and ordering of management units for subnetworks 210, 220 and 230 could have been selected or designed (or can be updated) with asymmetry when seen from either direction from the column head in the ring subnetworks, as well as with uniqueness in the types and/order of the management units.

Figure 3:
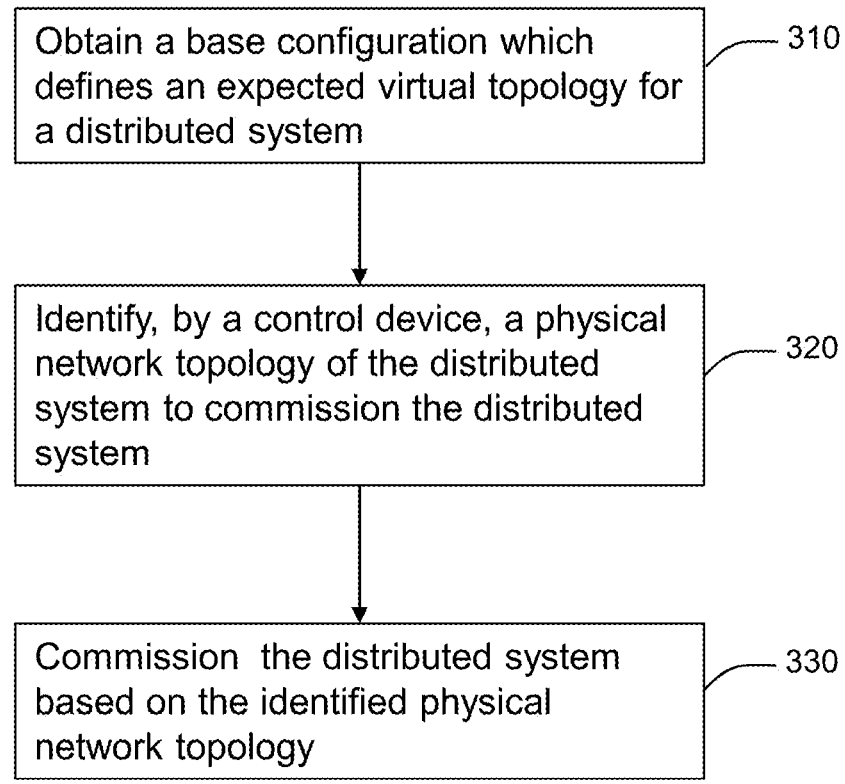
FIG. 3 is a flow chart illustrating example operations of a method by which a distributed system is commissioned, in accordance with an embodiment.

FIG. 3 is a flow chart illustrating example operations of a method 300 by which a distributed system is commissioned, in accordance with an embodiment. The method 300 begins at block 310 in which a control device obtains a base configuration which can define an expected virtual topology for a distributed system. The expected virtual topology of the base configuration can be designed or generated with uniqueness and asymmetry to differentiate different parts of the distributed system from each other in order to facilitate physical-to-virtual pairing. For example, the expected virtual topology can be designed or generated to differentiate subnetworks and/or differentiate network nodes (e.g., connected devices that are communicatively coupled to the control device) and their connected order within a subnetwork, particularly for subnetworks with a ring network topology or the like. The control device can obtain the base configuration from a local or remote memory or from a remote computer device or system.

At block 320, the control device identifies a physical network topology of the distributed system. In various embodiments, the control device can automatically discover the physical network topology of the network nodes, e.g., connected devices, of the distributed system using the base configuration and device information collected through a network scan (e.g., network discovery). The device information can, for example, include information relating to an identity of the connected devices and their relative location (e.g., neighboring network node(s)) in the distributed system. The result of the initial automatic discovery may result in a complete identification of the physical network topology or a partial identification of the physical network topology (e.g., undetermined/unmatched/unidentified physical locations for connected device(s) in the network topology). If only a partial physical network topology is identified, the control device can obtain additional information to identify the remainder of the physical network topology. The additional information can include information relating to a physical layout of connected devices or subnetworks of the distributed system. The control device can obtain additional information, for example, through operation of the distributed system and its components (and analysis thereof) including the use of internal signals, from a user, or from some other source of information available to the control device.

At block 330, the control device can commission the distributed system based on the identified physical network topology. The commissioning operations can include pairing the electronic address (e.g., network address) of the network nodes, such as connected devices, to their physical location, such as a specific compartment (e.g., drawer, etc.) in a specific column. As previously described, in various embodiments, the distributed system can be a motor control center (MCC) having a plurality of columns, which contain a plurality of motor management units (MMUs) arranged in compartments of the columns.

Figure 4:
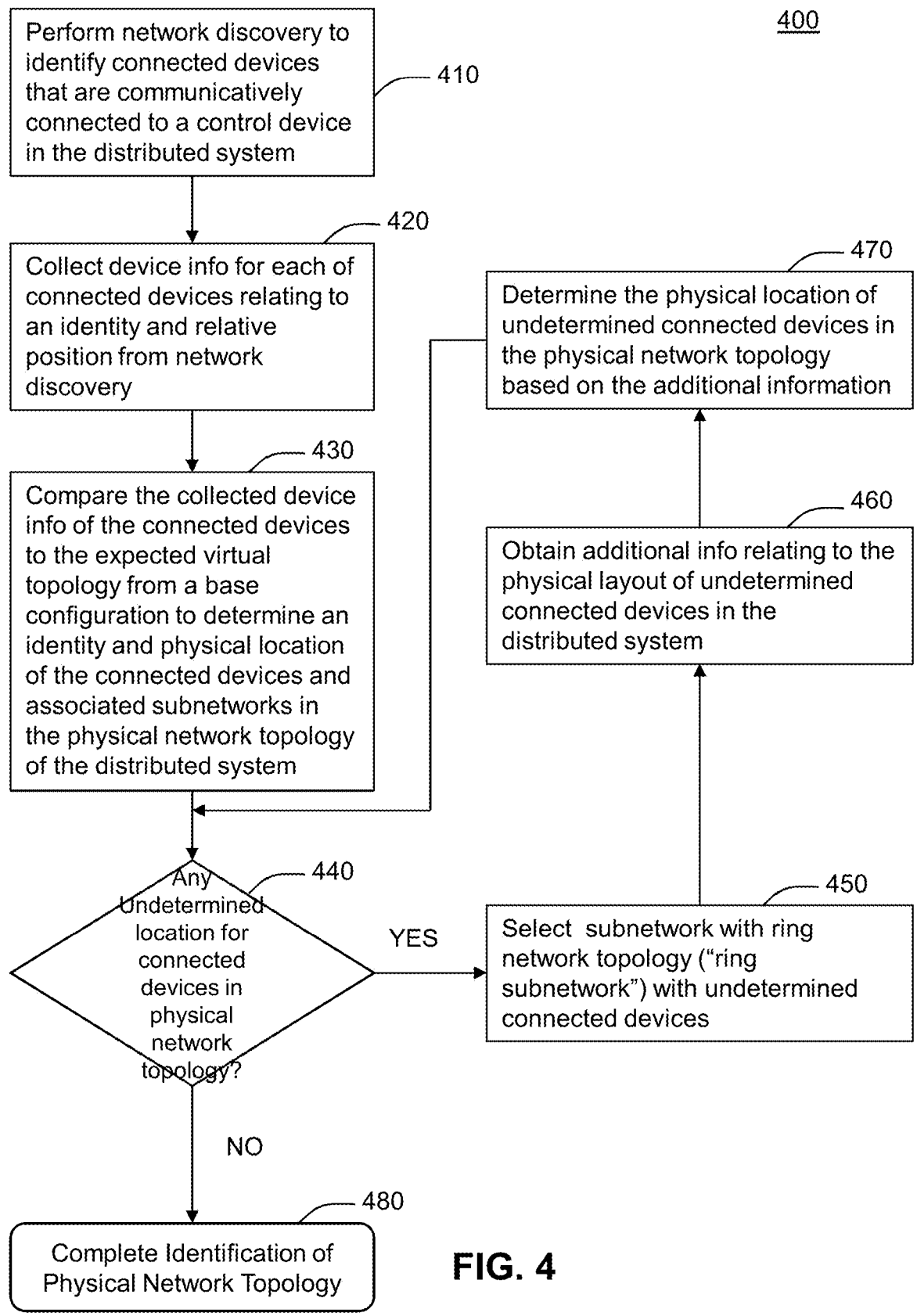
FIG. 4 is a flow chart illustrating example operations of a method by which physical network topology of a distributed system is identified, in accordance with an embodiment.

FIG. 4 is a flow chart illustrating example operations of a method 400 by which a physical network topology of a distributed system is identified, in accordance with an embodiment. The method 400 begins at blocks 410 and 420 in which a control device performs network discovery to perform a network scan, which can identify connected devices that are communicatively coupled to the control device in the distributed system, and to collect device information for each of the connected devices. The device information can include information relating to an identity and relative position of the connected device in the distributed system. In various embodiments, the devices may be connected in an Ethernet, and network discovery can be implemented using a link layer discovery protocol (LLDP) or other similar discovery protocol. The distributed system may employ a network architecture with devices connected in a ring network topology (e.g., a loop, a loop with sub-loops, etc.) to incorporate redundancy in the distributed system.

At block 430, the control device can compare the collected device information of the connected devices to the expected virtual topology from the base configuration to determine an identity and physical location of the connected devices and associated subnetworks in the physical network topology of the distributed system. For example, the control device can perform physical-to-virtual pairing, which can involve evaluation for uniqueness and asymmetry in the design of the distributed system.

At block 440, the control device can determine if the identification of the physical network topology for the distributed system is incomplete (e.g., only a partial identification of the physical network topology). For example, the control device can determine if the physical location of any connected device (e.g., column head, MMU, etc.) remains undetermined in the physical network topology for the distributed system. If the identity and physical location of the connected devices have all been identified (e.g., they match the expected virtual topology), the control device has completed identification of the physical network topology of the distributed system at 480.

If the identification of the physical network topology is incomplete at block 440, the control device can select a subnetwork (e.g., a column) with undetermined connected devices at block 450. At block 460, the control device can obtain additional information relating to the physical layout of the connected devices in the distributed system. For example, internal signals in the distributed system can be used to differentiate a relative location between two or more connected devices in the same subnetwork or in different subnetworks. It is possible to ascertain, for example, if a connected device is upstream or downstream from another connected device in the same subnetwork/column, if a connected device(s) of one subnetwork/column is closer to or farther away from the control device than a connected device(s) of another subnetwork/column, or a combination thereof. In this way, the connected order/direction of the connected devices of a subnetwork may be identified, which, in turn, allows a top/first or bottom/last connected device of a subnetwork/column to be determined. The additional information may also be obtained from a user. The user can confirm or provide, via a user device, information relating to the physical location of an undetermined/unmatched/unidentified ("undetermined") subnetwork(s) (e.g., the specific column housing the connected devices of the subnetwork(s)), or the physical location of any undetermined connected device(s) (e.g., the specific compartment/drawer in a column housing the connected device(s)).

At block 470, the control device can determine the physical location of the undetermined/unmatched connected devices in the physical network topology based on the additional information. The method returns to block 440 in which the control device can determine if the identification of the physical network topology for the distributed system is still incomplete (e.g., only a partial identification of the physical network topology). If still incomplete, the control device can select another subnetwork (e.g., a column) with undetermined connected devices at block 450, and perform blocks 460 and 470 for the selected subnetwork to identify more of the physical network topology. The control device can perform blocks 450, 460 and 470 for the subnetworks (with undetermined connected devices) one-at-a-time until the physical network topology is determined to be complete at block 440 at which time the method proceeds to block 480.

It should be understood that the above method 400 is provided as a non-limiting example. The method 400 also can incorporate other operations, for example, to obtain additional information relating to the physical layout of subnetwork(s) (e.g., column(s) or column head(s)). For example, internal signals can be used to obtain information, such as a physical proximity of the connected device(s) of different subnetworks to the control device, and thus, the proximity of different subnetworks to the control device. In this way, the connected order of the subnetworks, e.g., columns or their column heads, can be ascertained to facilitate identification of the physical network topology, such as when the subnetworks are arranged in a ring network topology. Furthermore, if desired, physical-to-virtual pairing and operations associated therewith can be performed for one subnetwork at a time (e.g., one column at a time) until all subnetworks and their connected devices have been identified, depending on the network architecture of the distributed system to be commissioned.

Furthermore, although the internal signal(s) may be generated/provided and measured using equipment available in the assembled distributed system (e.g., power distribution system, power switch(es), sensor(s) for measuring a voltage, audio/frequency or other characteristics of an internal signal(s) at the network nodes/compartments, etc.), the distributed system can incorporate additional signal generators and sensors at desired physical locations in the system to gather additional information relating to the physical layout of network nodes (e.g., connected devices) and their associated subnetworks in the system.

Figure 5:
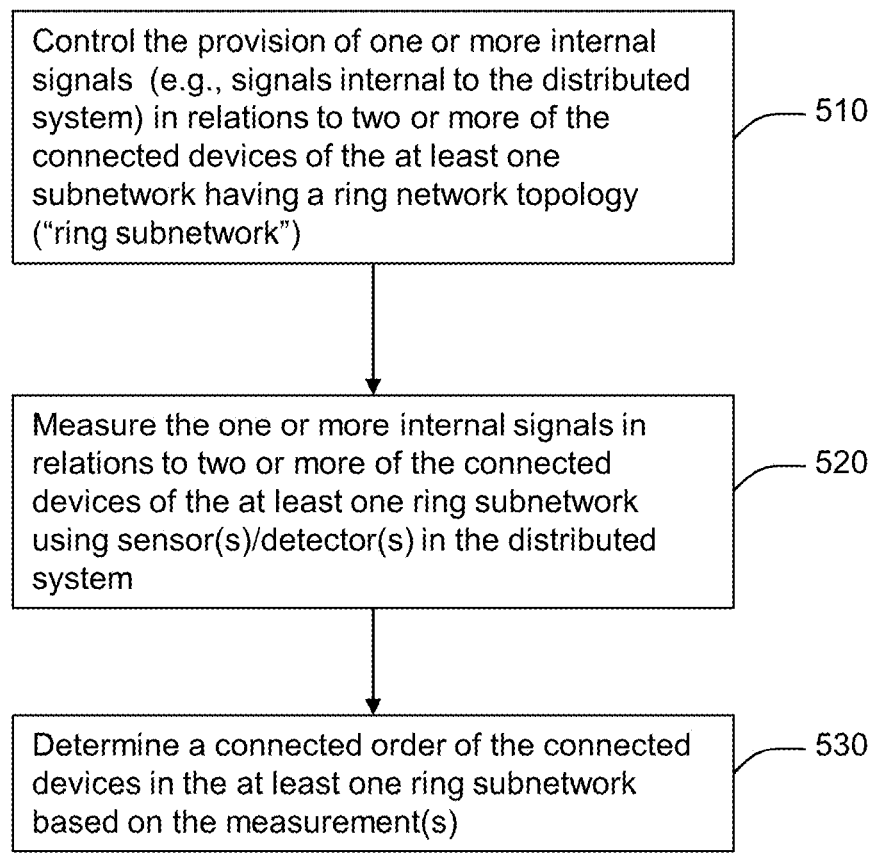
FIG. 5 is a flow chart illustrating example operations of a method by which internal signal(s) in the distributed system can be used to obtain additional information relating to a physical layout of connected devices of a subnetwork of a distributed system, in accordance with an embodiment.

FIG. 5 is a flow chart illustrating example operations of a method 500 by which internal signal(s) in the distributed system can be used to obtain additional information relating to a physical layout or order of connected devices of a subnetwork of a distributed system, in accordance with an embodiment. In this example, the subnetwork can have a ring network topology, and the connected devices of the subnetwork can be housed in respective compartments in a column. The equipment in the compartments can be powered through a power supply bus. For the purposes of explanation, the method 500 will be described with reference to the example in which the internal signal is a voltage signal (e.g., a control voltage signal) supplied to the connected devices of a subnetwork, which is housed in a column.

The method 500 begins at block 510 in which the control device can control the provision or generation of one or more internal signals in relations to two or more of the connected devices of at least one subnetwork having a ring network topology. The connected devices can include undetermined connected devices. In an example, the control device can control the supply, including a magnitude, of a voltage signal supplied to connected devices of a selected subnetwork for which additional information is to be obtained.

At block 520, the control device obtains measurements of the one or more internal signals in relations to two or more of the connected devices of the at least one ring subnetwork. For example, the measurement of the voltage signal at a connected device can be detected or derived using information from a sensor(s), e.g., a voltage sensor, current sensor, etc. Accordingly, voltage measurements can be taken for two or more of the connected devices of the subnetwork, and transmitted to the control device.

At block 530, the control device determines a connected order (e.g., the connection order or direction in the column) of the connected devices of the subnetwork based on the voltage measurements. For example, the voltage measurements for two connected devices are compared, and the connected device with a greater voltage magnitude can be considered upstream of the other connected device, according to how devices are connected to receive power from the power supply bus is in a column. In various embodiments, the compartments (e.g., drawers) for the connected devices to be measured in the column can be selectively controlled to waste power so that the voltage drop between measured connected devices is increased to make measurement more certain.

The method 500 is described above using a voltage signal as the internal signal in the distributed system; however, other types of internally provided or generated signals in the distributed system can be used to obtain additional information relating to a physical layout of connected devices in a subnetwork with a ring network topology. For example, an audio signal (e.g., audible frequency signal) can be generated in the distributed system in the compartments of the connected devices for which measurements are to be taken. The audio signal generated from each compartment can be measured from a common point, such as for example, at the control device using sensor(s) (e.g., sound sensor, frequency sensor, etc.). The common point can be selected in the enclosure or column of the control device, e.g., a top or bottom thereof. The generation and measurement of an audio signal can be performed one-at-a-time for each of the at least two connected devices of the subnetwork, and the connected device with the greater or smaller measurement is either upstream or downstream of the other connected device in the column depending on the location of the common point. In one example, the audio signal can be generated in a compartment for a connected device by having the power supply switch at a desired or weird (audible) frequency via a power switch in the compartment (e.g., a power connect or disconnect switch, etc.). Alternatively, a signal generator can be provided in the compartments for at least for two connected devices for each column in the distributed system so that additional information can be obtained relating to the physical layout for each column and its connected devices.

Furthermore, internal signal measurements for connected devices described herein may also be used to differentiate the proximity of connected devices of one subnetwork in one column to the control device from another subnetwork in another column relative to the control device. For example, audio signals can be produced and measured for connected devices of different subnetworks housed in different columns. In this way, a connected order of the subnetworks to the control device, if arranged in a ring network topology, can also be ascertained.

Figure 6:
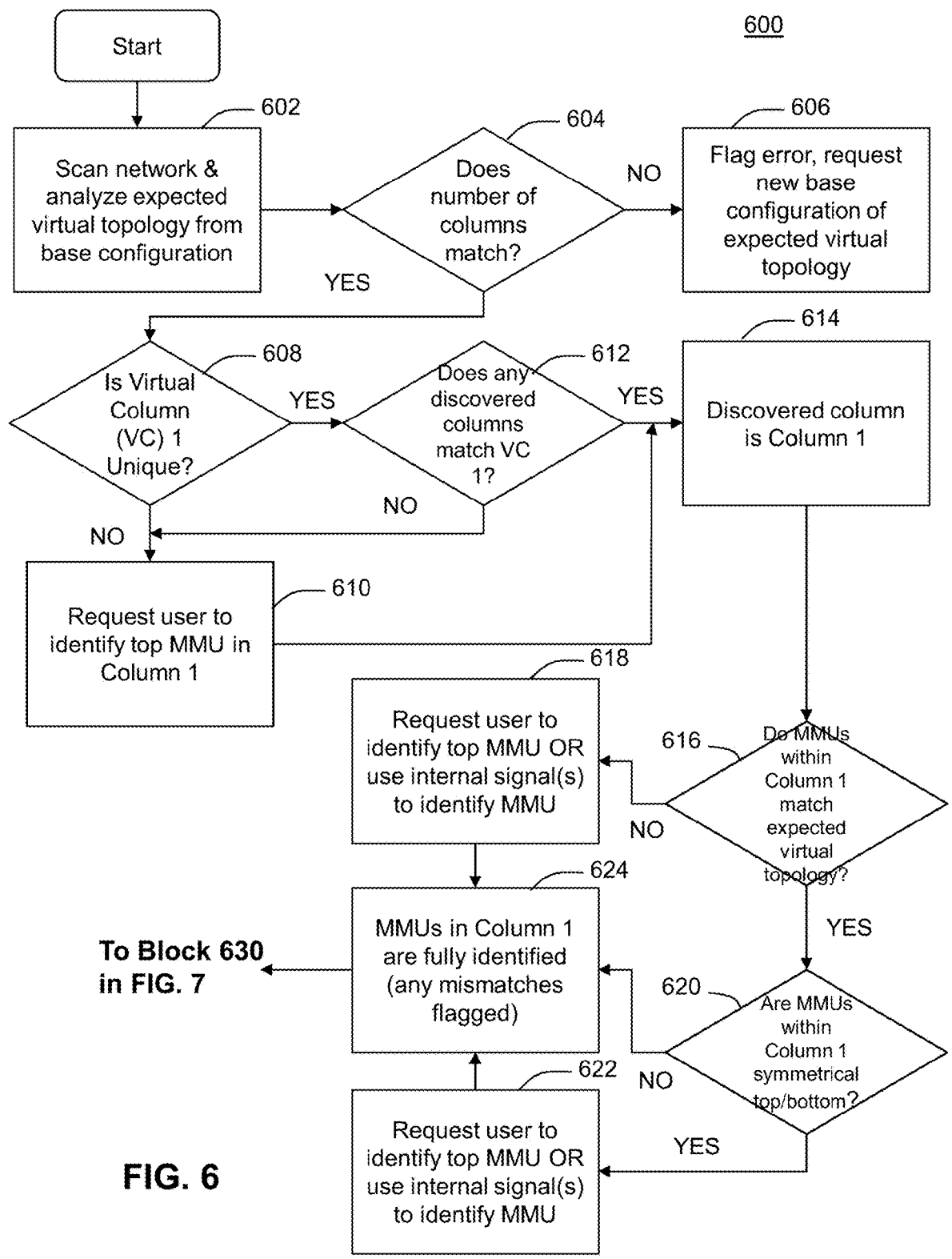
FIGS. 6, 7 and 8 are flow charts illustrating example operations of a method by which a distributed system is commissioned, in accordance with another embodiment.
Figure 7:
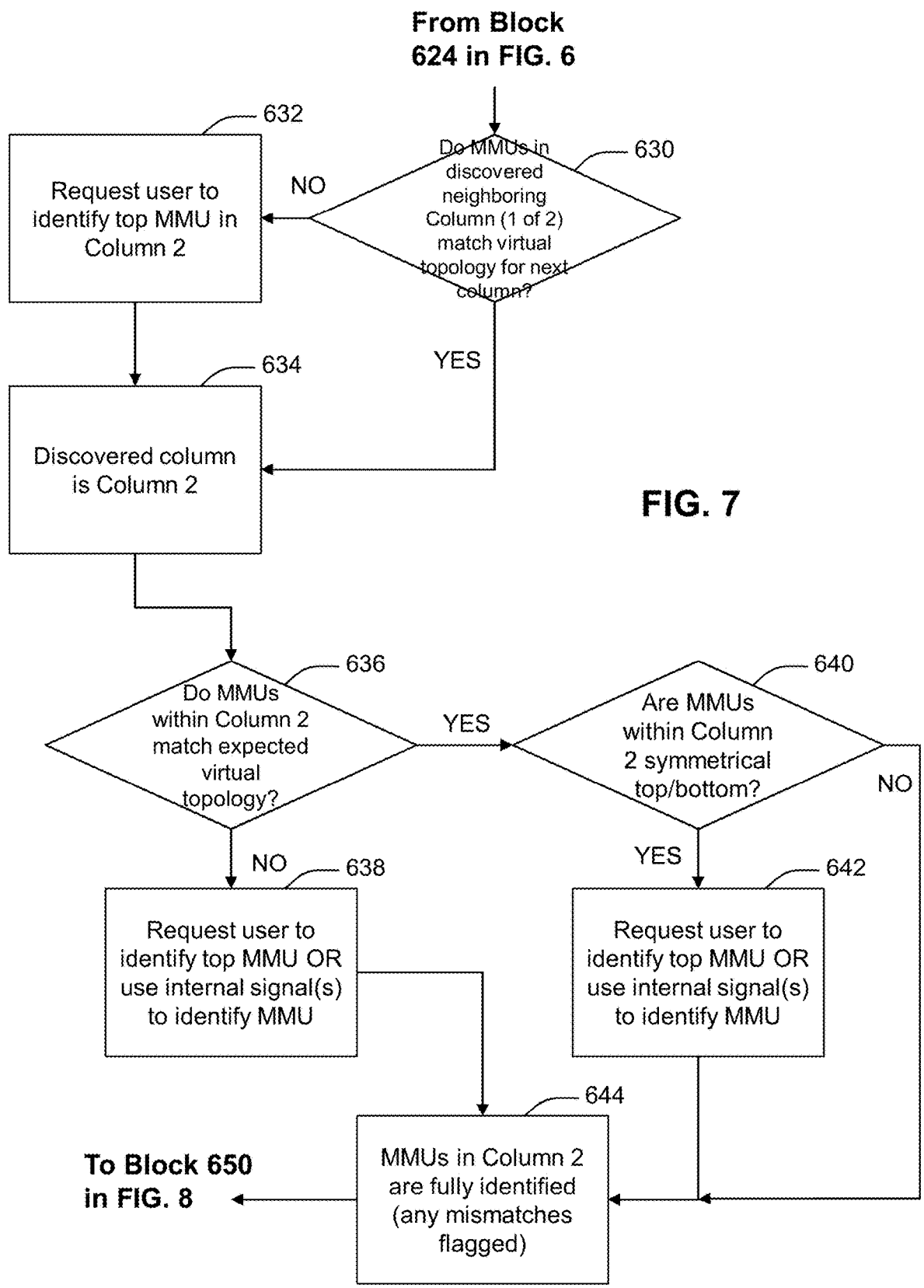
Figure 8:
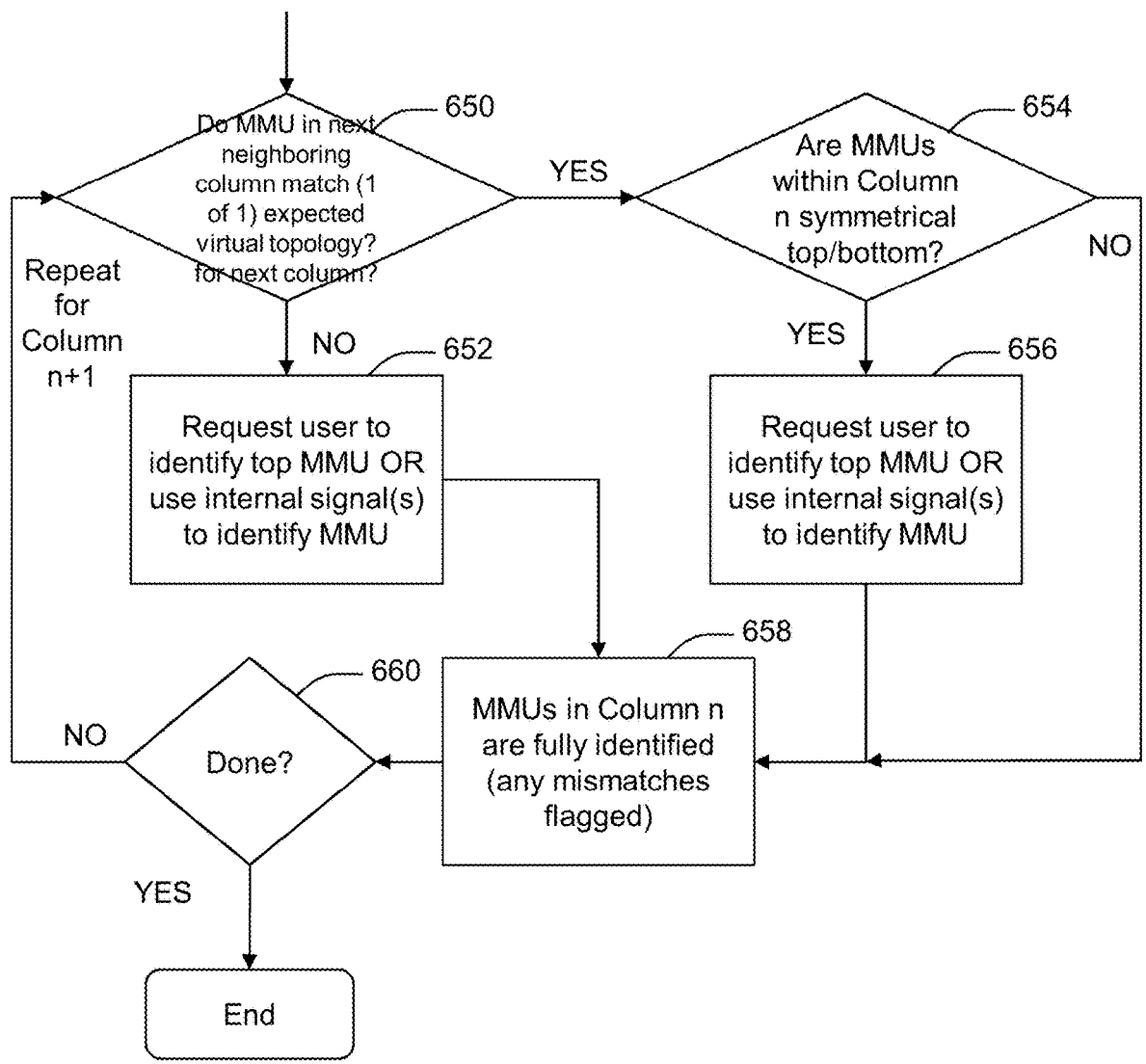

FIGS. 6, 7 and 8 are flow charts illustrating example operations of a method 600 by which a distributed system is commissioned, in accordance with another embodiment. For the purposes of explanation, the method 600 will be described with reference to the example in which the distributed system is a motor control center (MCC), with a plurality of columns housing connected devices such as column heads (e.g., network or Ethernet switches) and motor management units (MMUs). In this example, the connected devices can be configured into subnetworks housed in respective columns. For example, each column may represent a subnetwork of connected devices in the MCC. One or more of the columns may have its MMUs connected in a ring network topology (or loop), and the columns may also be connected in a ring network topology, such as for example to the control device.

As shown in FIG. 6, the method 600 begins at block 602 in which the control device initiates a network scan of the distributed system to collect device information for connected devices communicatively coupled to the control device. The control device analyzes the collected information versus the expected virtually topology of the distributed system in the base configuration. The expected virtual topology can include virtual columns and their column heads, virtual MMUs and their virtual compartments in the virtual columns and any other virtual connected device and their locations for the expected distributed system. At block 604, the control device determines whether the number of columns identified through the network scan matches the number of virtual columns in the base configuration. If the number of columns identified through the network scan does not match the number of virtual columns in the expected virtual topology, the control device can flag the error and request a new (or updated) base configuration of the expected virtual topology for the distributed system at block 606. Otherwise, if the number of columns matches, the method 600 proceeds to block 608.

At block 608, the control device determines whether virtual column (VC) 1 is unique from the expected virtual topology of the base configuration. If the virtual column 1 is not unique, the control device can request a user to identify the top MMU in column 1 at block 610. Thereafter, the method 600 proceeds to block 614 in which column 1 is discovered using the identification of the top MMU from the user.

Turning back to block 608, if the virtual column 1 is not unique, the control device determines whether any discovered columns from the network scan matches virtual column 1 at block 612. If none of the discovered columns match virtual column 1, then the method proceeds to block 610 and then block 614, in which the user identified the top MMU, as previously explained above. Otherwise, if a discovered column matches the virtual column 1, the control device proceeds to block 614 in which the discovered column is identified as column 1 in the physical network topology.

At block 616, the control device determines whether the MMUs within the column 1 match the expected virtual topology, e.g., match counterpart MMUs of a virtual column or in other words a virtual twin column. If they do not match, the control device obtains additional information for identifying the MMUs at block 618. For example, the control device can request a user to identify the top MMU of column 1 or employ internal signals (e.g., control voltage signal, audio signal, etc.) to obtain information relating to the physical layout of the MMUs in column 1 to identify the top MMU. Thereafter, the method 600 proceeds to block 624 in which the control device fully identifies the MMUs in column 1 of the physical network topology, and flags any mismatches.

Turning back to block 616, if they do match, the control device determines at block 620 whether the MMUs within column 1 are symmetrical, e.g., symmetrical from the Top and Bottom or, in other words, symmetrical in either direction in the ring subnetwork topology for the column. If they are not symmetrical, the control device fully identifies the MMUs in column 1 of the physical network topology, and flags any mismatches at block 624. If they are symmetrical, the control device obtains additional information for identifying the MMUs at block 622 (e.g., similar to previously discussed block 618). Thereafter, the method 600 proceeds to block 624 in which the control device fully identifies the MMUs in column 1 of the physical network topology, and flags any mismatches.

From block 624, the method 600 proceeds to block 630 shown in FIG. 7. At block 630, the control device determines whether the MMUs in the discovered neighboring column (1 or 2) match the expected virtual topology, e.g., virtual twin column, for the next column. If not, the control device requests the user to identify the top MMU in column 2 at block 632, and identifies the discovered column as column 2 in the physical network topology of the distributed system at block 634. Otherwise, if there is a match at block 630, the control device identifies the discovered column as column 2 in the physical network topology of the distributed system at block 634. From block 634, the method 600 proceeds to block 636.

At block 636, the control device determines whether the MMUs within column 2 match the expected virtual topology, e.g., match counterpart MMUs of a virtual column or in other words a virtual twin column. If they do not match, the control device obtains additional information for identifying the MMUs at block 638. For example, the control device can request a user to identify the top MMU of column 2 or employ internal signals (e.g., control voltage signal, audio signal, etc.) to obtain information relating to the physical layout of the MMUs in column 2 to identify the top MMU. Thereafter, the method 600 proceeds to block 644 in which the control device fully identifies the MMUs in column 2 of the physical network topology, and flags any mismatches.

If they do match at block 636, the control device determines at block 640 whether the MMUs within column 2 are symmetrical, e.g., symmetrical from the Top and Bottom or, in other words, symmetrical in either direction in the ring subnetwork topology for the column. If they are not symmetrical, the control device fully identifies the MMUs in column 2 of the physical network topology, and flags any mismatches at block 644. If they are symmetrical, the control device obtains additional information for identifying the MMUs at block 642 (e.g., similar to previously discussed block 638). Thereafter, the method 600 proceeds to block 644 in which the control device fully identifies the MMUs in column 2 of the physical network topology, and flags any mismatches.

From block 644, the method 600 proceeds to block 650 shown in FIG. 8. At block 650, the control device determines whether the MMUs in the next neighboring column (e.g., column n) match the expected virtual topology, e.g., match counterpart MMUs of the next virtual column or in other words a virtual twin column. If they do not match, the control device obtains additional information for identifying the MMUs at block 652. For example, the control device can request a user to identify the top MMU of the column n or employ internal signals (e.g., control voltage signal, audio signal, etc.) to obtain information relating to the physical layout of the MMUs in the column n to identify the top MMU. Thereafter, the method 600 proceeds to block 658 in which the control device fully identifies the MMUs in the column n of the physical network topology, and flags any mismatches.

If they do match at block 650, the control device determines at block 654 whether the MMUs within the column are symmetrical, e.g., symmetrical from the Top and Bottom or, in other words, symmetrical in either direction in the ring subnetwork topology for the column n. If they are not symmetrical, the control device fully identifies the MMUs in the column n of the physical network topology, and flags any mismatches at block 658. If they are symmetrical, the control device obtains additional information for identifying the MMUs at block 656 (e.g., similar to previously discussed block 652). Thereafter, the method 600 proceeds to block 658 in which the control device fully identifies the MMUs in column n of the physical network topology, and flags any mismatches.

From block 658, the method 600 proceeds to block 660 in which the control device determines if the identification of the physical network topology of the distributed system is complete, and thus, done. If the identification of the physical network topology is done, the method 600 ends. Otherwise, if identification is not done, the method 600 proceeds back to block 650 for the next neighboring column n+1. Each of the discovered columns is matched one-at-a-time to their virtual twin or counterpart until the identification of the physical network topology is completed.

As described above for the method 600, there are situations where mismatches may be flagged by the control device, and further action may need to be taken. These situations may occur as a result of incorrect assembly of the distributed system, e.g., MCC, to be commissioned or incorrect configuration for the expected virtual topology.

Figure 9:
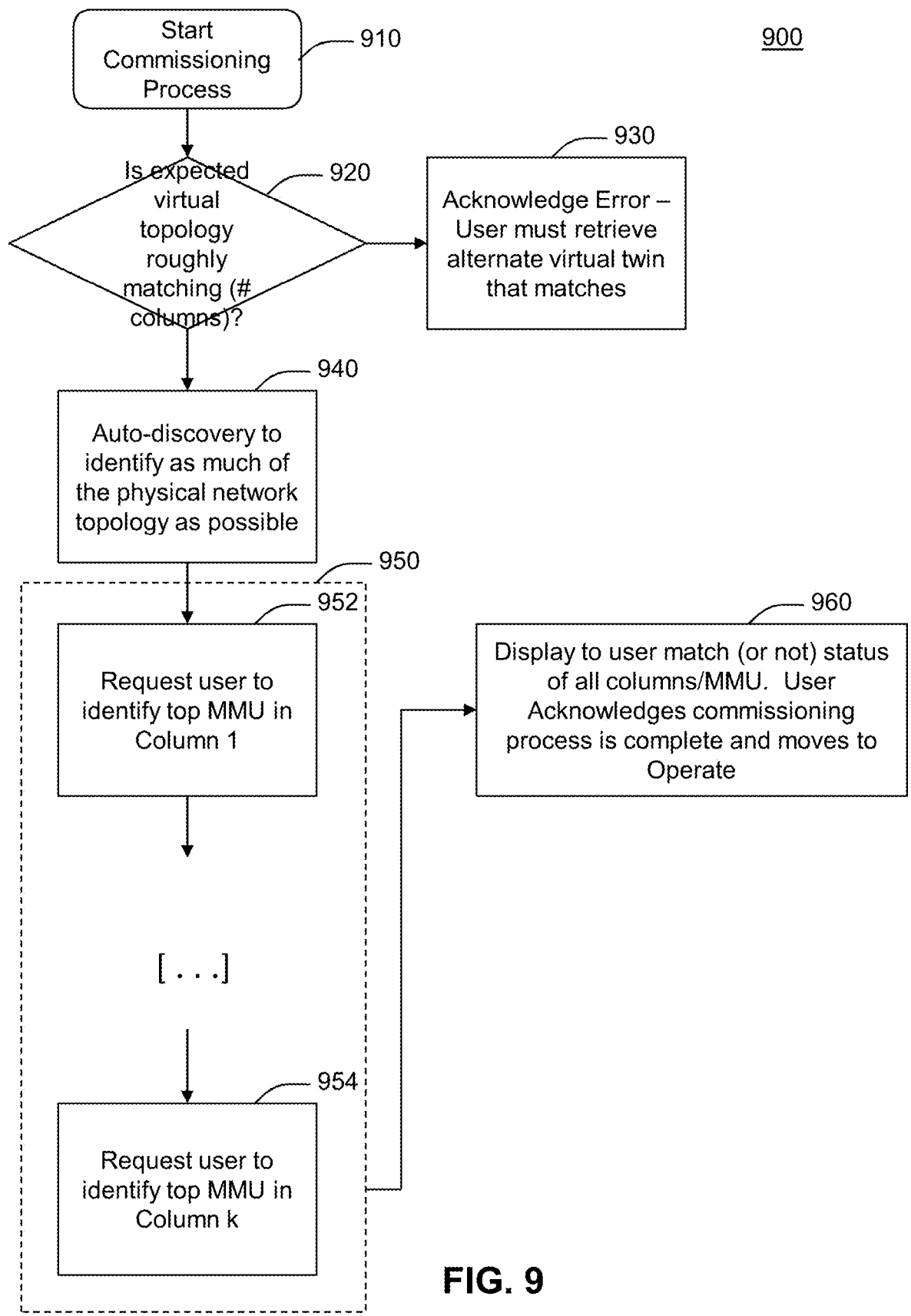
FIG. 9 is a flow chart illustrating example operations of a method by which a distributed system is commissioned, in accordance with a further embodiment.

FIG. 9 is a flow chart illustrating example operations of a method 900 by which a distributed system is commissioned, in accordance with a further embodiment. For the purposes of explanation, the method 900 will be described with reference to the example in which the distributed system is a motor control center (MCC), with a plurality of columns housing connected devices such as column heads (e.g., network or Ethernet switches) and motor management units (MMUs). In this example, the connected devices can be configured into subnetworks housed in respective columns. For example, each column may represent a subnetwork of connected devices in the MCC. One or more of the columns may have its MMUs connected in a ring network topology (or loop), and the columns may also be connected in a ring network topology, such as for example to the control device.

As shown in FIG. 9, the method 900 begins at block 910 in which a user can initiate a commissioning process through the use of user operable computing device such as a HMI touchscreen device (e.g., 132 of FIG. 1) or a mobile device.

At block 920, the control device determines whether the expected virtual topology of the distributed system to be commissioned generally/roughly matches the device information collected, for example, from a network scan of the distributed system. For example, the control device can compare the number of columns identified from the network scan to the number of columns in the expected virtual topology of the base configuration. If the number of columns does not match, the control device flags the mismatch error and reports it to the user. At block 930, the user can acknowledge the error via the user operable computing device, and replace the current base configuration. For example, the user can retrieve an alternate expected virtual topology from an alternate base configuration that matches for use in the commissioning process by the control device. In various embodiments, instead of or in addition to checking the number of columns, a total number of connected devices (e.g., MMUs) also can be checked initially to determine whether there is a general match between the information relating to the physical network topology from a network scan and the expected virtual topology.

If there is a general match at block 920, the control device performs auto discovery to determine as much of the physical network topology of the distributed system based on the device information from the network scan and the expected virtual topology of the base configuration at block 940.

At block 950, if the identification of the physical network topology is incomplete, the control device can obtain additional information to determine the physical location of undetermined connected devices or their associated columns. This situation may occur, for example, when there are some symmetrical sets of connected devices in the compartments (e.g., drawer) of a column (e.g., all 1 Us in a column as shown in subnetworks 210 and 220 of FIG. 2), when all columns are identical to each other or the first column is not unique, or when the panel builder has made an assembly mistake on the first or second column. In these and other situations where parts of the topology remain unknown, additional information may be obtained from a user. For example, the control device can request the user to identify the top connected device in a column (e.g., a top MMU) or its drawer. The user can provide drawer identification for a desired connected device (e.g., MMU) in a column via a code scan (e.g., QR code scan) using a mobile device or by pushing a physical button (e.g., a button on the drawer). An HMI, such as HMI touchscreen device (e.g., 132 in FIG. 1), can, for example, illuminate multiple LEDs and say "please hit the button on the tip MMU. Depending on the situation, there may be a number of devices (e.g., MMUs) to scan or for which to obtain drawer identification in any one of columns 1 through k (wherein k is the number of columns in the system) as generally shown by blocks 952 and 954.

At block 960, the user can be provided with the status of any matching or non-matching columns and their connected devices. For example, the status information can be provided to and displayed on the user mobile device or HMI touchscreen device, through which the user also can acknowledge that the commissioning process is complete and can move the assembled distributed system to an operating state. In various embodiments, a virtual representation of the columns and compartments can be displayed on the user mobile device or HMI touchscreen device, with the drawers and/or columns highlighted (or not), outlined (or not), color coded, etc. to indicate their status, e.g., matched, remain undetermined, or have been flagged or other state. In this way, the identification progress for the physical network topology can be provided to the user.

Figure 10:
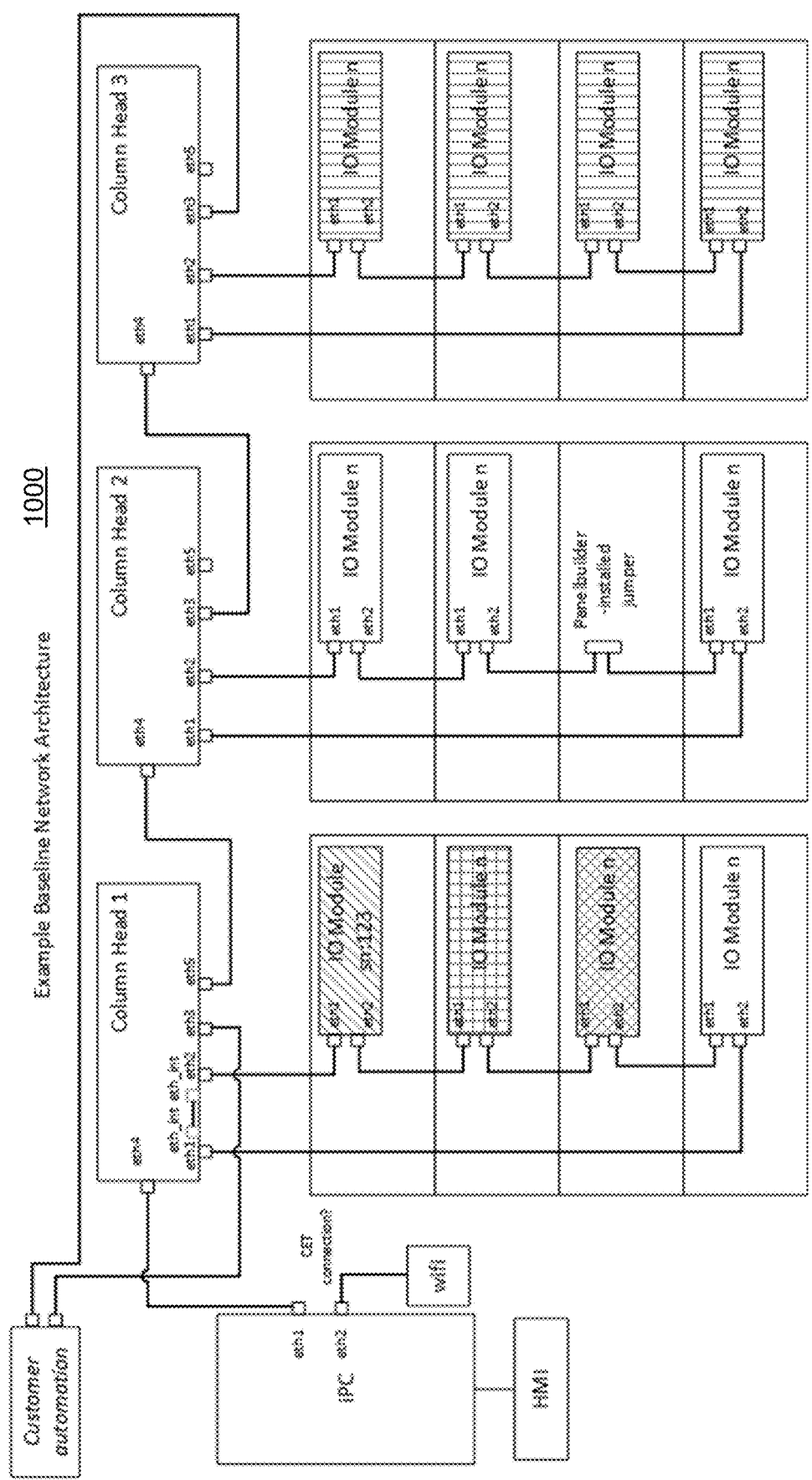
FIG. 10 is a block diagram of an example distributed system with a baseline network architecture, in accordance with an embodiment.
Figure 11:
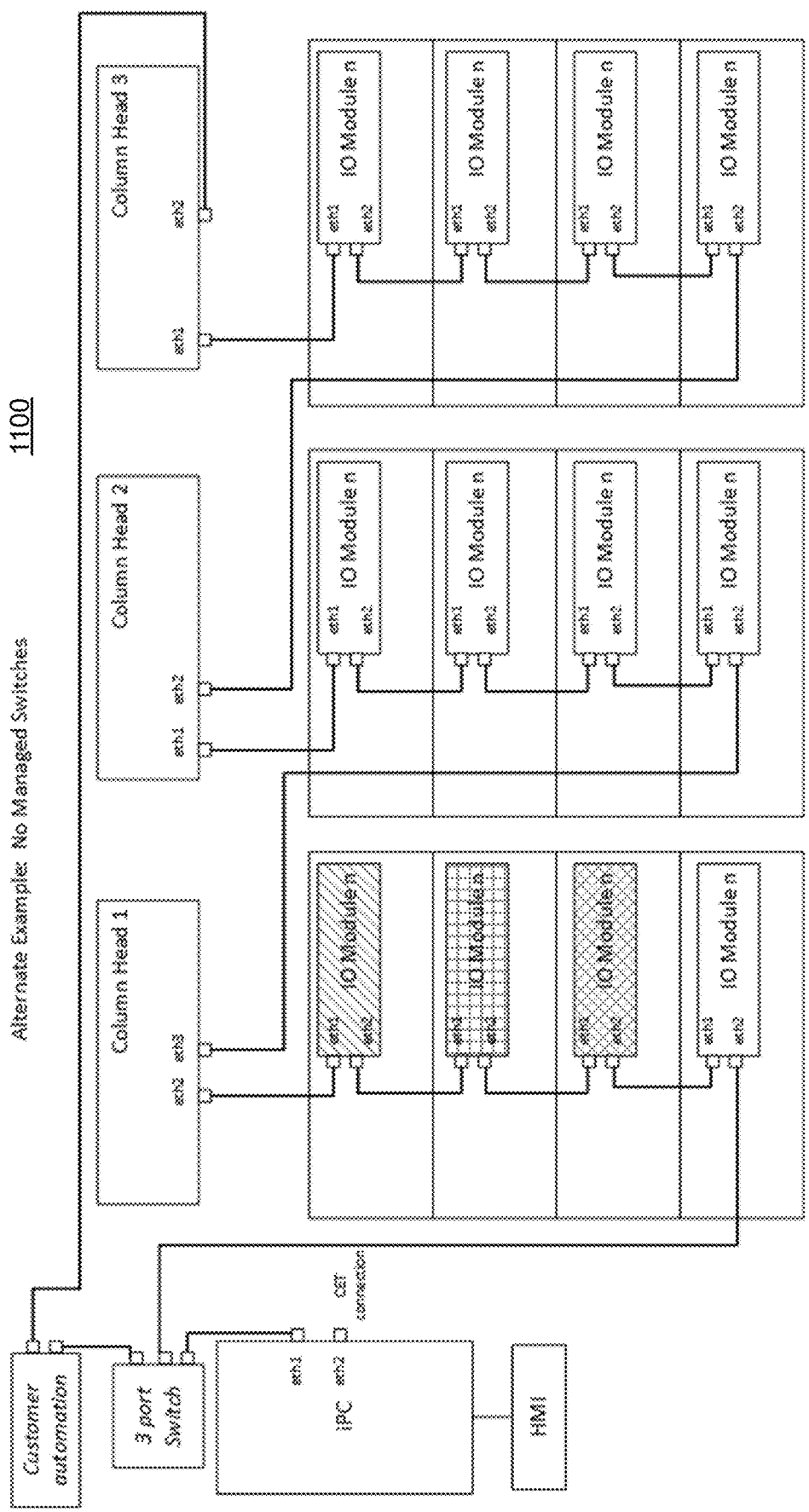
FIG. 11 is a block diagram of an example distributed system with a network architecture having no managed switches, in accordance with an embodiment.
Figure 12:
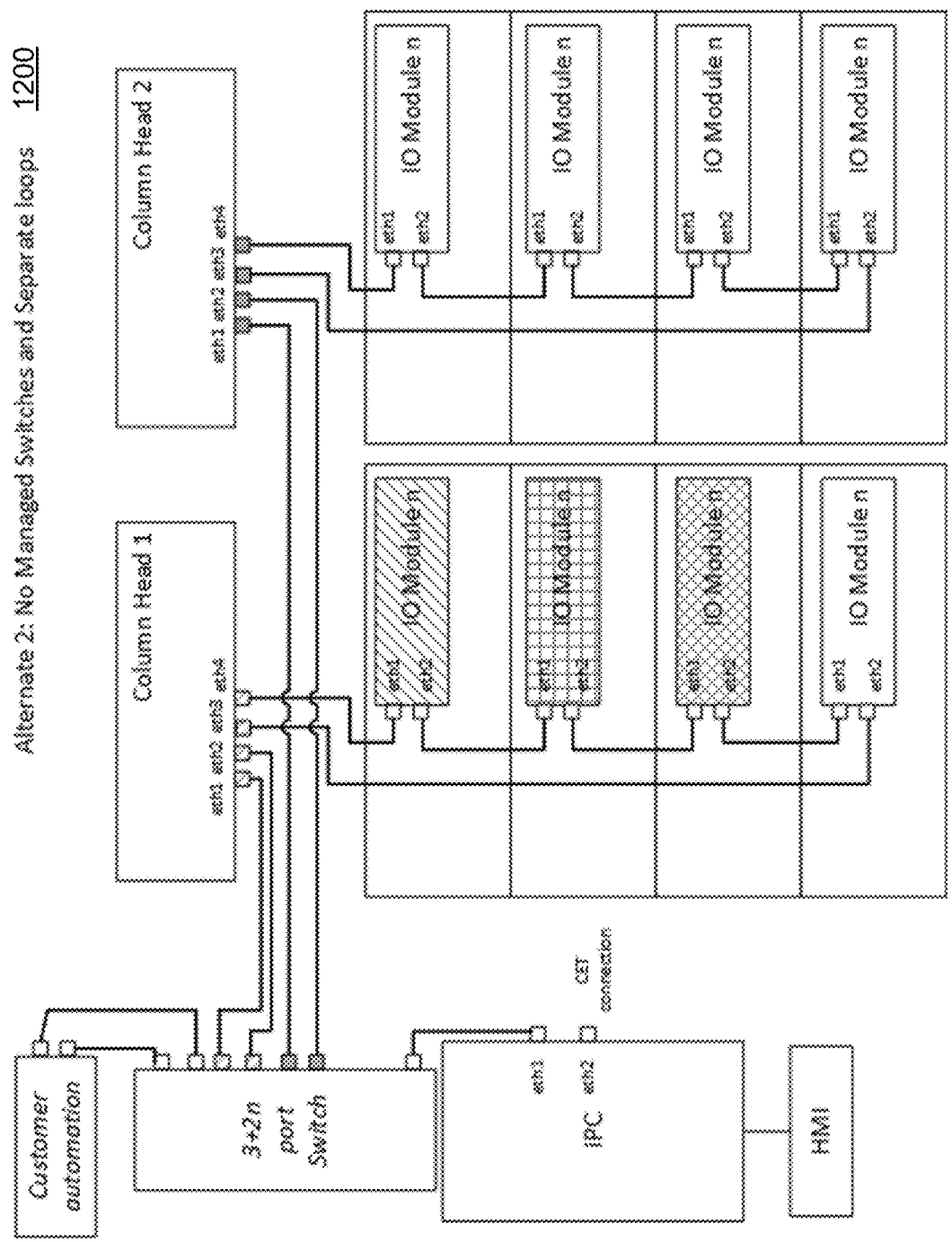
FIG. 12 is a block diagram of an example distributed system with a network architecture having no managed switches and having separate loops, in accordance with an embodiment.

Various example network architectures of a distributed system are shown in FIGS. 10, 11 and 12. These network architectures can be employed with MCCs or other similar distributed systems, which may require commissioning.

FIG. 10 is a block diagram of an example distributed system 1000 with a network baseline architecture, in accordance with an embodiment. In this example, the distributed system 1000 includes a control device (e.g., industrial person computer (iPC)), which is connected to an HMI device operable by a user and also may be capable of communicating over a wireless medium such as Wi-Fi. The control device is communicatively coupled to a plurality of columns and customer automation (e.g., customer device), in a network configuration such as an Ethernet configuration. Each column includes a column head (e.g., Ethernet switch) and a plurality of IO Modules (e.g., Input/Output Modules) for connected devices such as MMUs, which are housed in respective compartments (e.g., drawers) of respective columns. Different types of connected devices are shown using different hatching for their respective IO Modules.

In this example, there are two ports on the Printed Circuit Board Assembly (PCBA). All columns and IO Modules are within one loop (e.g., two failures bring down whole MCC). Network topology ambiguity can be solved by identifying one (1) 10 module on each column. The control device (e.g., iPC) can be plugged into any of the column heads depending on customer preference.

FIG. 11 is a block diagram of an example distributed system 1100 with a network architecture having no managed switches, in accordance with an embodiment. In this example, the distributed system 1100 includes a control device (e.g., industrial person computer (iPC)) connected to an HMI device operable by a user. The control device is communicatively coupled, via a port switch (e.g., 3 port switch) to a plurality of columns, and customer automation (e.g., customer device), in a network configuration such as an Ethernet configuration. Each column includes a column head (e.g., Ethernet switch) and a plurality of IO Modules (e.g., Input/Output Modules) for connected devices such as MMUs, which are housed in respective compartments (e.g., drawers) of respective columns. Different types of connected devices are shown using different hatching for their respective IO Modules.

In this example, there are two ports on the PCBA, and a 3 port switch next to the control device. All columns and IO Modules are within one loop (e.g., two failures bring down whole MCC). Network topology ambiguity can be solved by identifying one (1) IO module on each column. The network architecture is a lower cost option.

FIG. 12 is a block diagram of an example distributed system 1200 with a network architecture having no managed switches and having separate loops, in accordance with an embodiment. In this example, the distributed system 1200 includes a control device (e.g., industrial person computer (iPC)) connected to an HMI device operable by a user. The control device is communicatively coupled, via a port switch (e.g., 3-2 port switch) to a plurality of columns, and customer automation (e.g., customer device), in a network configuration such as an Ethernet configuration. Each column includes a column head (e.g., Ethernet switch) and a plurality of IO Modules (e.g., Input/Output Modules) for connected devices such as MMUs, which are housed in respective compartments (e.g., drawers) of respective columns. Different types of connected devices are shown using different hatching for their respective IO Modules.

In this example, there are two port switch in each column head and two ports on PCBA (or 4 RJ45 on column head PCBA), and a 3-2 port switch next to the control device. Each column is on its own loop. Network topology ambiguity can be solved by identifying one (1) IO module on each column.

It should be understood that the distributed systems shown in FIGS. 10-12 are simply examples of different network architectures for a distributed system. These network architectures can include a different number of columns and/or IO Modules according to the application.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. For example, It should understood that the method and system described herein can be employed for commissioning distributed systems other than MCCs, such as a switchboard and other networked systems, which may require assembly and commissioning.

Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method of facilitating the commissioning of a distributed system, comprising:
    obtaining a base configuration which defines an expected virtual topology for a distributed system; and
    identifying, by a control device, a physical network topology of the distributed system, the identifying comprising:
        performing network discovery to identify a plurality of connected devices that are communicatively coupled to the control device in the distributed system and to collect device information for each of the plurality of connected devices relating to its identity and relative position in the distributed system, the distributed system including a plurality of subnetworks of connected devices from the plurality of connected devices, at least one of the plurality of subnetworks having a ring network topology or the plurality of subnetworks being connected in a ring network topology, and
        comparing the collected device information for the plurality of connected devices to the expected virtual topology from the base configuration to determine an identity and physical location of the plurality of connected devices and associated subnetworks in the physical network topology of the distributed system; and
    commissioning the distributed system according to the identified physical network topology.

2. The method of claim 1, wherein if the physical location of some connected devices in the at least one subnetwork having a ring network topology remains undetermined in the physical network topology for the distributed system after the comparing, the identifying further comprising: (1) obtaining additional information relating to a physical layout of the connected devices in the at least one subnetwork, and (2) determining the physical location of the undetermined connected devices in the physical network topology based on the additional information.

3. The method of claim 2, wherein the obtaining comprises:
    employing one or more internal signals, which are measured, to obtain additional information relating to the physical layout of the connected devices in the at least one subnetwork.

4. The method of claim 3, wherein the one or more internal signals comprise a voltage signal supplied to the connected devices of the at least one subnetwork, a connected order of the connected devices in the at least one subnetwork being determined based on a comparison of measured voltage at two or more of the connected devices of the at least one subnetwork.

5. The method of claim 3, wherein the one or more internal signals comprise an audio signal outputted to or at two or more of the connected devices of the at least one subnetwork, a connected order of the connected devices in the at least one subnetwork being determined based on a comparison of audio measurements for two or more of the connected devices of the at least one subnetwork.

6. The method of claim 1, wherein the distributed system comprises a motor control center having a plurality of columns each including connected devices comprising a column head and motor management units connected thereto in a subnetwork configuration, and the control device comprises an industrial computer of the motor control center.

7. The method of claim 1, wherein the device information for a connected device comprises at least relative location information identifying any neighboring connected device and identification information identifying a type of device or its capabilities.

8. The method of claim 1, wherein the comparing comprises:
matching the identified plurality of connected devices to virtual counterparts in the expected virtual topology from the base configuration using the collected device identification information to identify at least a partial physical network topology of the distributed system, the identified at least a partial physical network topology including an identity of one or more subnetworks of connected devices from the plurality of connected devices and their connected devices, a connected order of the subnetworks, and/or a connected order of the connected devices for one or more of the subnetworks in the distributed system.

9. The method of claim 1, wherein the at least one subnetwork having a ring network topology comprises multiple subnetworks each having a ring network topology, and wherein if the physical location of connected devices for the multiple subnetworks remains undetermined for the distributed system, the obtaining is performed for the multiple subnetworks one-at-a-time until the physical location of all of the remaining undetermined connected devices of the multiple subnetworks are determined in the physical network topology for the distributed system based on the obtained additional information.

10. The method of claim 1, wherein the expected virtual topology from the base configuration is designed according to uniqueness and asymmetry rules to differentiate the subnetworks from each other and/or a connected order of the connected devices in the subnetworks.

11. The method of claim 1, wherein the plurality of subnetworks are connected in a ring network topology, and wherein if the physical location of some subnetworks from the plurality of subnetworks remains undetermined in the physical network topology for the distributed system, the identifying further comprising: (1) obtaining information relating to a physical layout of the undetermined subnetworks, and (2) determining the physical location of the undetermined subnetworks in the physical network topology based on the obtained information.

12. A system for facilitating the commissioning of a distributed system, comprising:
memory for storing a base configuration which defines an expected virtual topology for a distributed system; and
at least one processor for identifying, by a control device, a physical network topology of the distributed system to commission the distributed system, the at least one processor configured to:
identify a physical network topology of the distributed system by:
performing network discovery to identify a plurality of connected devices that are communicatively coupled to the control device in the distributed system and to collect device information for each of the plurality of connected devices relating to its identity and relative position in the distributed system, the distributed system including a plurality of subnetworks of connected devices from the plurality of connected devices, at least one of the plurality of subnetworks having a ring network topology or the plurality of subnetworks being connected in a ring network topology, and
comparing the collected device information for the plurality of connected devices to the expected virtual topology from the base configuration to determine an identity and physical location of the plurality of connected devices and associated subnetworks in the physical network topology of the distributed system, and
commission the distributed system according to the identified physical network topology.

13. The system of claim 12, wherein if the physical location of some connected devices in the at least one subnetwork having a ring network topology remains undetermined in the physical network topology for the distributed system after the comparing, to identify the physical network topology, the processor is further configured to (1) obtain additional information relating to a physical layout of the connected devices in the at least one subnetwork, and (2) determine the physical location of the undetermined connected devices in the physical network topology based on the additional information.

14. The system of claim 13, wherein the additional information is obtained from measurements of one or more internal signals in the distributed system.

15. The system of claim 14, wherein the one or more internal signals comprise a voltage signal supplied to the connected devices of the at least one subnetwork, a connected order of the connected devices in the at least one subnetwork being determined based on a comparison of measured voltage at two or more of the connected devices of the at least one subnetwork.

16. The system of claim 14, wherein the one or more internal signals comprise an audio signal outputted to or at two or more of the connected devices of the at least one subnetwork, a connected order of the connected devices in the at least one subnetwork being determined based on a comparison of audio measurements for two or more of the connected devices of the at least one subnetwork.

17. The system of claim 12, wherein the distributed system comprises a motor control center having a plurality of columns each including connected devices comprising a column head and motor management units connected thereto in a subnetwork configuration, and the control device comprises an industrial computer of the motor control center.

18. The system of claim 12, wherein the device information for a connected device comprises at least relative location information identifying neighboring connected device(s) and identification information identifying a type of device or its capabilities.

19. The system of claim 12, wherein to compare the collected device information, the processor is configured to:
match the identified plurality of connected devices to virtual counterparts in the expected virtual topology from the base configuration using the collected device identification information to identify at least a partial physical network topology of the distributed system, the identified at least a partial physical network topology including an identity of one or more subnetworks of connected devices from the plurality of connected devices and their connected devices, a connected order of the subnetworks, and/or a connected order of the connected devices for one or more of the subnetworks in the distributed system.

20. The system of claim 12, wherein the at least one subnetwork having a ring network topology comprises multiple subnetworks each having a ring network topology, and
wherein if the physical location of connected devices for the multiple subnetworks remains undetermined for the distributed system, the processor obtains additional information for the multiple subnetworks one-at-a-time until the physical location of all of the remaining undetermined connected devices of the multiple subnetworks are determined in the physical network topology for the distributed system based on the obtained additional information.

21. The system of claim 12, wherein the expected virtual topology from the base configuration is designed according to uniqueness and asymmetry rules to differentiate the subnetworks from each other and/or a connected order of the connected devices in the subnetworks.

22. The system of claim 12, wherein the processor is further configured to commission the distributed system according to the identified physical network topology.

23. The system of claim 12, wherein the plurality of subnetworks are connected in a ring network topology, and
wherein if the physical location of some subnetworks from the plurality of subnetworks remains undetermined in the physical network topology for the distributed system, the processor is further configured to identify the physical network topology by (1) obtaining information relating to a physical layout of the undetermined subnetworks, and (2) determining the physical location of the undetermined subnetworks in the physical network topology based on the obtained information.

24. A non-transitory computer readable medium storing computer code, which when executed by at least one processor, implements a method of facilitating the commissioning of a distributed system comprising:
obtaining a base configuration which defines an expected virtual topology for a distributed system; and
identifying a physical network topology of the distributed system, the identifying comprising:
performing network discovery to identify a plurality of connected devices that are communicatively coupled to the control device in the distributed system and to collect device information for each of the plurality of connected devices relating to its identity and relative position in the distributed system, the distributed system including a plurality of subnetworks of connected devices from the plurality of connected devices, at least one of the plurality of subnetworks having a ring network topology or the plurality of subnetworks being connected in a ring network topology, and
comparing the collected device information for the plurality of connected devices to the expected virtual topology from the base configuration to determine an identity and physical location of the plurality of connected devices and associated subnetworks in the physical network topology of the distributed system; and
commissioning the distributed system according to the identified physical network topology.

* * * * *